United States Patent Office 3,454,924
Patented July 8, 1969

3,454,924
SELECTIVE FREQUENCY SPECTRUM RECONSTRUCTION OF SEISMIC TRACES
John W. C. Sherwood, Whittier, and Swan A. Sie, Placentia, Calif., assignors to Chevron Research Company, San Francisco, Calif., a corporation of Delaware
Filed Jan. 9, 1968, Ser. No. 696,600
Int. Cl. G01v 1/00
U.S. Cl. 340—15.5                        10 Claims

ABSTRACT OF THE DISCLOSURE

Apparatus for selectively improving the frequency spectrum of recorded seismic traces while retaining amplitude variations of wavelets in the traces by passing each trace through a plurality of band pass filters, the frequency bandwidth of each filter being approximately equal to the reciprocal of the time constant or duration of the earth filter response function; after passage of each of the filtered traces through a corresponding individual adaptive gain control unit, the filtered signals are selectively connected in parallel to two or more summing circuits. Each of these summing circuits permits a selected amount of particular frequencies over a known time period in the complete seismic trace to be recombined in a final summing circuit. The output of this final summing circuit generates the improved trace. In a preferred form, the filter bands are simplified in construction and signal fidelity is maintained by multiplying the speed of the field record to increase bandwidth (in this case by a factor of 4); this output is further modulated on an operating fraquency of about 24,000 cycles per second before passage to the bandpass filters and adaptive gain controls.

---

The present invention relates to the field of seismology. More particularly, it relates to apparatus for processing a seismic record trace to obtain an improved amplitude versus frequency spectrum of the information recorded therein. The apparatus combines frequency filtering and adaptive gain control so that a desired output spectrum can be specified for a seismic record for a wide range of input spectra, and that spectrum can be gradually changed during the record processing time.

It is an established practice in the seismic data processing art to produce a field record of a plurality of seismic data traces on a magnetic tape wrapped around a cylindrical drum. The magnetic tape record is then brought to a data processing center where pick-up heads are used to produce electrical seismic signals representing the information in each of the seismic data traces. After passage through amplifiers the electrical seismic signals are introduced into analyzing circuits, and finally, after various forms of processing, the electrical seismic signals are transformed into visible, modified seismic traces by printing them out on a suitable record. This printed record is then used to infer the subsurface strata of the area being surveyed.

The bulk of the developments in the seismic processing art have come in the realm of analyzing circuits; and, since the art of analyzing circuits is fairly well developed, recent developments have been primarily concerned with the addition of new elements to elements known to the art, or with novel combinations of elements known to the art. Examples of elements known to the art are multiple frequency filters, gain controls, phase control means and time delay means.

The present invention includes the creation of a novel combination of such elements, known to the art, as well as the addition of at least two new elements to this novel combination. Conventional seismic data processing steps such as removal of moveout and static corrections are not dealt with in the present specification. They may be undertaken before or after the present invention is used. In accordance with the present invention, the traces are processed individually, and not as a group, therefore there is no chance of losing time orientation, trace-to-trace alignments or trace-within-record alignment.

When seismic waves propagate from a source (such as a dynamite source) they travel into the earth until they are reflected by stratal interfaces. If the earth were an ideal transmitter and if the stratal interfaces were ideal reflecting surfaces the reflected waves sensed by conventional geophones would look like sets of distinct pulses. But neither the transmission characteristics of the earth nor the reflection characteristics of stratal interfaces are ideal.

As a seismic pulse propagates through the earth the time duration over which it has a significant amplitude tends to increase. This effect is caused by several different physical phenomena. One of these is the general property of earth media to preferentially attenuate high frequency components of motion relative to low frequency components.

Another contributing factor, which is often of greater importance, particularly in offshore prospecting, is the influence of multiple reflections. The composite transmitted seismic wavelet consists of the transmitted version of the initial seismic pulse followed by multiple reflections of that pulse from various geological interfaces through which it has passed. The effect of this is particularly noticeable when two such interfaces have strong reflection coefficients and are in close proximity. In this situation the associated multiple reflections overlap and merge with the directly transmitted seismic pulse and can yield a greatly elongated composite seismic wavelet. This wavelet broadening appears to limit the degree to which subsequent reflecting interfaces can be resolved. It is evidently desirable, if possible, to contract the composite seismic wavelet.

It is therefore one object of the present invention to reconstitute seismic signals so that all individual wavelets that have been lengthened by passage through the earth filter are contracted toward their original size. This object is realized by picking the parameters of the analyzing circuit so that the circuit acts as the approximate inverse of the earth filter. It has been found that an approximate inverse earth filter is created if the circuit contains multiple band pass filters whose bandwidths are made approximately equal to the reciprocal of the time duration of the expected earth filter impulse response function (about 200 milliseconds, or ⅕ second). In practice, 5 cycles per second has been found to be about the proper bandwidth for most earth formations. The circuit may contain as many filters as are deemed necessary to cover adequately the seismic spectrum. If coverage from 10 cycles per second to 100 cycles per second is required then 18 contiguous 5-cycle band pass filters would be required.

The aforementioned object of the present invention as well as other objects and advantages thereof may be more fully understood by reference to the drawings wherein.

Figure 4A:
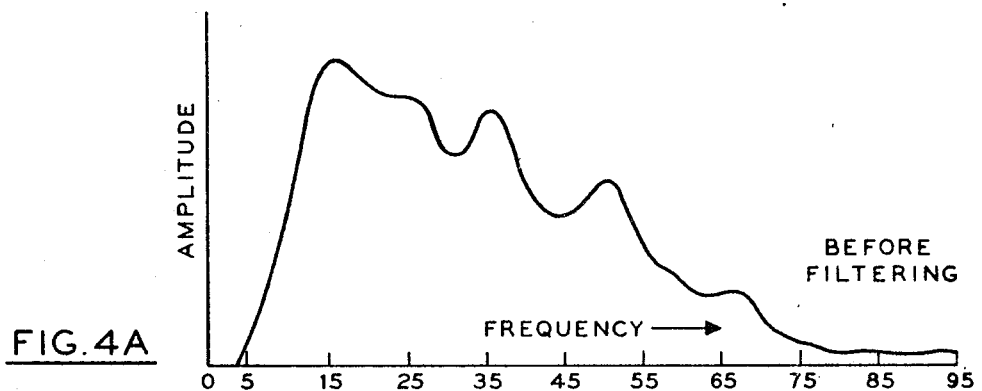
Figure 4B:
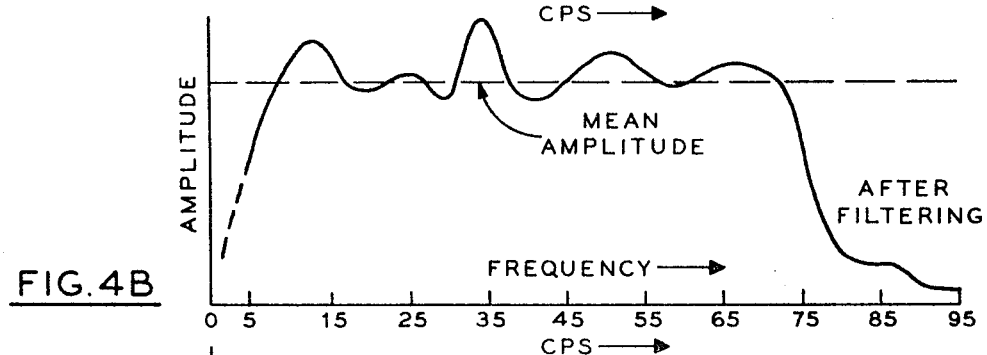

FIGURES 4A and 4B present two graphs illustrating the net effect that the apparatus of this invention has on the spectrum of a given portion of the record.

Figure 5A:
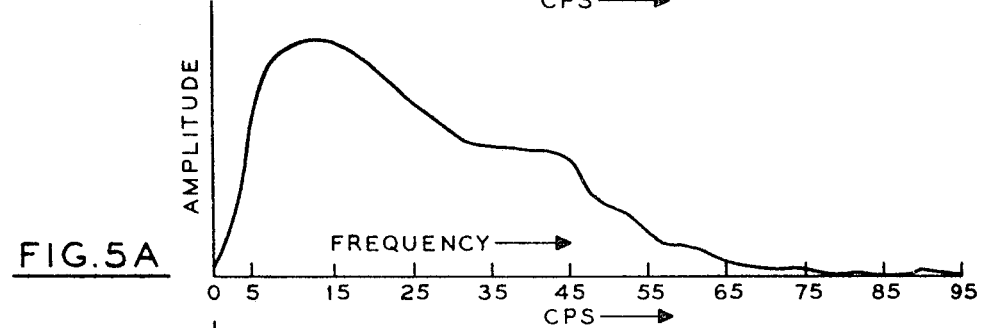
Figure 5B:
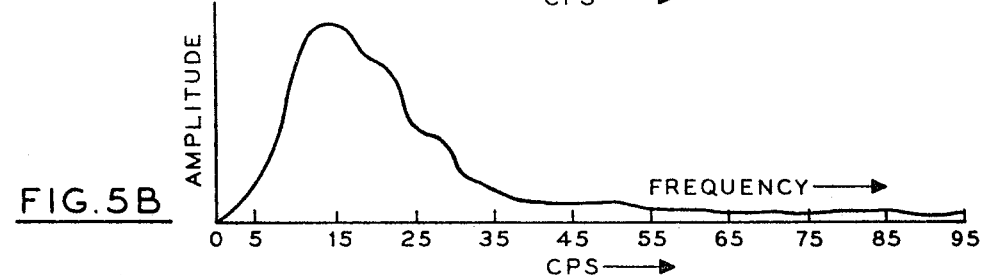

FIGURES 5A and 5B present two graphs illustrating possible spectra early and late, respectively, along a seismic record.

Figure 6A:
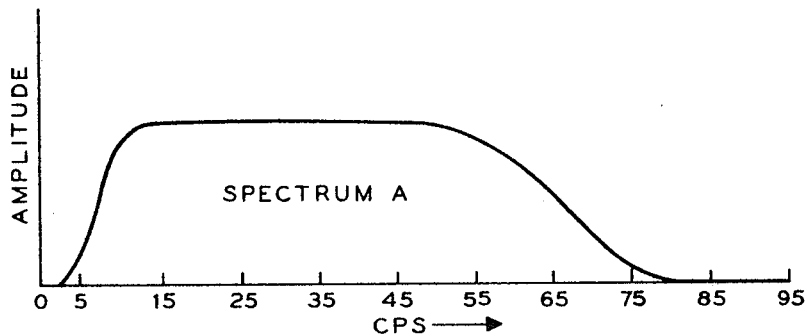
Figure 6B:
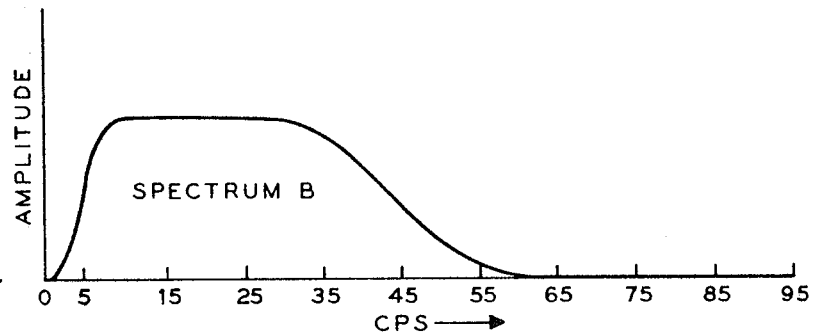

FIGURES 6A and 6B are smoothed mean amplitude spectra to reconstruct selectively the seismic trace amplitude versus frequency spectra of FIGURES 5A and 5B, respectively, in accordance with this invention.

Figure 1:
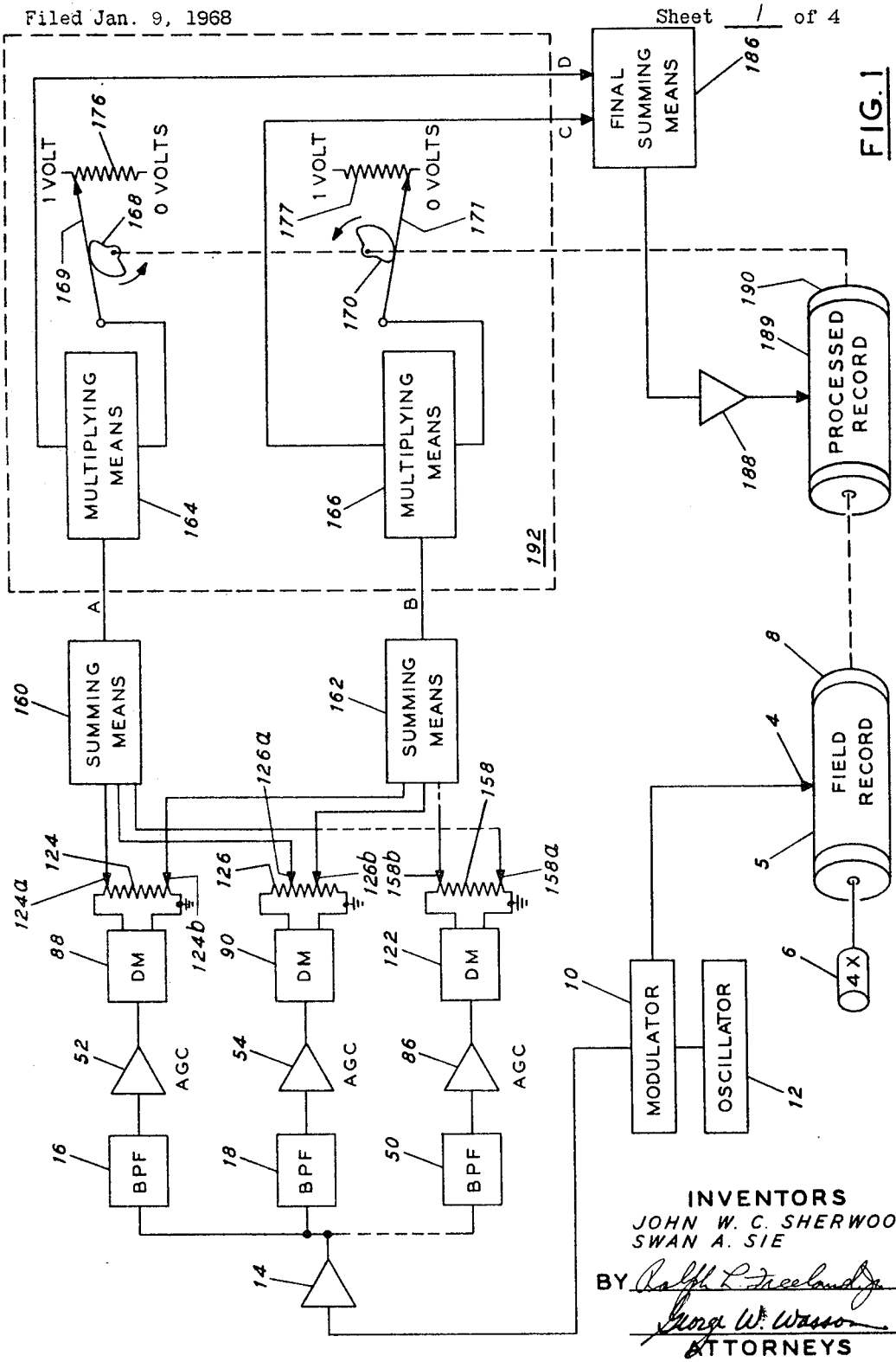
FIGURE 1 is a schematic illustration of the overall system for obtaining improved seismic record traces.

As shown in FIGURE 1, playback head 4 picks up the seismic signal recorded on the field record 5 wrapped around cylindrical drum 8. In one embodiment of the present invention motor 6 drives cylindrical drum 8 at four times the speed at which the field record was recorded. This serves to expand the bandwidths that the analyzing circuit receives. The effect is to expand the frequencies from, say, the range between 10 cycles per second and 90 cycles per second to the range between 40 cycles per second and 360 cycles per second. By expanding the bandwidths the filters are made easier to design; and the speeding up reduces the costs of the processing.

As shown in FIGURE 1, the electrical seismic signal from playback head 4 is introduced to modulator 10 which is driven by oscillator 12. In one important aspect of the present invention the modulator provides a means of simplifying the design of the remainder of the system. It is relatively easy to design and fabricate equipment to filter a high frequency spectrum while it is difficult to design and fabricate equipment which accurately filters the low frequency seismic spectrum. Previously, those skilled in the seismic art have gone to great pains to design and fabricate equipment which filters the seismic spectrum. By modulation of a carrier signal with the electrical seismic signal the resulting signal may be made to have a frequency of the order of thousands, or tens of thousands, of cycles per second. In practice a carrier signal of 24,000 cycles per second has been found to work quite well.

A second advantage to employing a carrier signal is that only one basic amplifier is required. If the usual low frequency seismic spectrum is filtered directly then some of the filters must have characteristics that are markedly different from some of the others. For instance, one bandpass filter will pass the band from 10 to 15 cycles per second while another will pass the band from 65 to 70 cycles per second. When a carrier signal is used the difference between the characteristic frequencies of filters will be in the fourth significant figure. For example, one bandpass filter will pass the band from 24,020 to 24,025 cycles per second while another will pass the band from 24,080 to 24,085 cycles per second. There is no limitation on oscillator 12, the means for driving modulator 10, but a crystal oscillator has been found to be especially satisfactory.

After being picked up from the magnetic tape and, in alternative embodiments of the present invention, after being speeded up, or after the addition of a carrier signal, the electrical seismic signal is fed through playback amplifier 14 into the parallel sets of bandpass filters 16 through 50, while only three of the filters are shown, in this embodiment they represent eighteen filters to cover the frequencies from 10 to 100 cycles per second (c.p.s.) in 5 c.p.s. steps. As discussed previously each of the filters has a bandwidth approximately equal to the reciprocal of the time duration of the expected earth filter impulse response function or about 5 cycles per second (c.p.s.). In one embodiment of the present invention the filters would have passbands set with adjacent frequencies of 5 c.p.s. over the required range, for example, from 10 to 15 cycles per second, 15 to 20 cycles per second, etc. In another embodiment, where the input is a modulation of a carrier, they would have passbands of 24,000 to 24,005 cycles per second, 24,005 to 24,010 cycles per second, etc.; in still another embodiment with the factor of four speed increase they would have passbands of 24,000 to 24,020 cycles per second, 24,020 to 24,040 cycles per second, etc. In all embodiments they will be connected in parallel and their outputs will lead into separate (in this example 18) adaptive gain control units which variably decrease or increase the amplitudes of the frequency bands so that the average amplitudes of all the bands are equal at any point to a predetermined level.

As is well known, it is physically impossible to design electrical filters that have passbands with infinitely sharp edges. A filter with a nominal passband of 10 to 15 cycles per second will pass frequencies lower than 10 and higher than 15 but with rapidly increasing attenuation as the frequency moves away from the nominal passband. In the apparatus of the present invention the filters have been designed so that drop in gain at the high end of one filter is opposite to, and approximately equal to, the increase in gain at the low end of the next filter so that each of the filters has an individual frequency band that is contiguous and overlapping with the band of the next adjacent frequency bands and all the filters in parallel have an amplitude response over their total range that is substantially flat with respect to frequency.

The term adaptive gain control unit is used in the description of the present invention in order to avoid the imprecision that might result if the term automatic gain control were used. At one time the term automatic gain control signified a control which tended to hold the amplitude of an electrical signal at a contsant average level, and conveyed a meaning different from the term, programmed gain control, that signified a control which altered a signal to make it conform to a set of predetermined levels at different periods in time. But some persons skilled in the seismic data processing art have used the term automatic gain control in describing also the second type of control. The term adaptive gain control, therefore, is used to signify a control which adapts the amount of amplification to the input signal so that the output signal is appropriately adjusted to a predetermined average level.

The adaptive gain control, as defined above and as used in this invention, consists of a circuit which senses the average amplitude of the input voltage over a period longer than the time duration of the expected earth-filter impulse response function (about 200 ms. (⅕ second)) when the rate of processing (playback speed) has not been increased; (about 800 ms. when the rate of processing has been increased by a factor of 4), but no longer than one second. The circuit then either attenuates, or amplifies, the sensed average voltage to produce the predetermined average output voltage. The predetermined value for the average output voltage is the same for all adaptive gain control units throughout the processing of a seismic trace.

It should be noted that any wavelet with a time duration considerably shorter than the period over which the input circuit takes it average will pass with little change through the adaptive gain control circuits. Therefore, since desired seismic information is usually contained in wavelets with time durations of 200 ms. and less, the gain control units will not alter the wavelet shapes significantly. Wavelets due to noise will, of course, also be passed with little change so long as their time durations are less than 200 ms.

In the embodiment of the present invention in which a carrier signal is used, the outputs of the adaptive gain control units are fed to individual demodulators 88 through 122 (also representing the 18 passbands) to remove the carrier signal. After passing through the demodulators and, in alternative embodiments, after passing only through the adaptive gain control units, the electrical seismic signals are fed into 18 potentiometers 124 through 158 connected as output devices across the 18 demodulators 88 through 122. The purpose of these potentiometers is to impart an idealized spectrum to the seismic signal. The inputs to the intermediate summing means, 160 and 162 are taken from output potentiometers 124 through 158. By presetting either or both of the potentiometer arms 124a and 124b, 126a and 126b etc., one can construct a wide range of average spectra at the outputs of the individual summing means.

Two individual intermediate summing means, 160 and 162 are shown in FIGURE 1. These permit transition from a first preset spectrum to a second preset spectrum during the processing of a seismic trace. It has been found that two preset spectra suffice for usual processing but more intermediate summing means may, of course, be used, making possible more preset spectra.

The output impedances of the demodulators, 88 to 122, the impedances of the potentiometers, 124 to 158, and the input impedances of the summing means, 160 and 162 are selected, by methods well known, to make the proportions of the signals transmitted into summing means 160 and 162 dependent only on the positions of the potentiometer arms, 124a, 126a, to 158a leading into the summing means 160, and not dependent upon the positions of other potentiometer arms such as 124b, 126b, etc.

Whereas the inputs to the intermediate summing means 160 and 162 are composed of constant preset proportions of the outputs from potentiometers 124 to 158, the inputs to the final summing means 186 are composed of time-varying proportions of the outputs from the intermediate summing means.

The time variation of the final output spectrum is achieved by the combined electrical-mechanical assembly 192. As shown, cams 168 and 170 driven in synchronism with the record input, move contacts 169 and 171 at a preprogrammed rate over voltage sources 176 and 177. The resulting variable voltages are fed from movable contacts 169 and 171 as inputs to multiplying means 164 and 166, respectively. The multiplying means may be of the type disclosed in U.S. Patent 2,952,812, Klein et al., Pulse Modulation Function Multiplier. The other input to each of multiplying means 174 and 166 is the output of the individual intermediate summing means 160 and 162, respectively. It is evident that at least one multiplying means is required for each individual intermediate summing means to generate a time-carrying contribution from each of the idealized spectra to the resultant spectrum.

The outputs of all the multiplying means are then introduced into an additive amplifier, identified as final summing means 186 in FIGURE 1. If necessary, recording amplifier 188 may also be used to prepare the final electrical seismic signal for "print out" of the final trace on processed record 189 on cylindrical drum 190.

Figure 2:
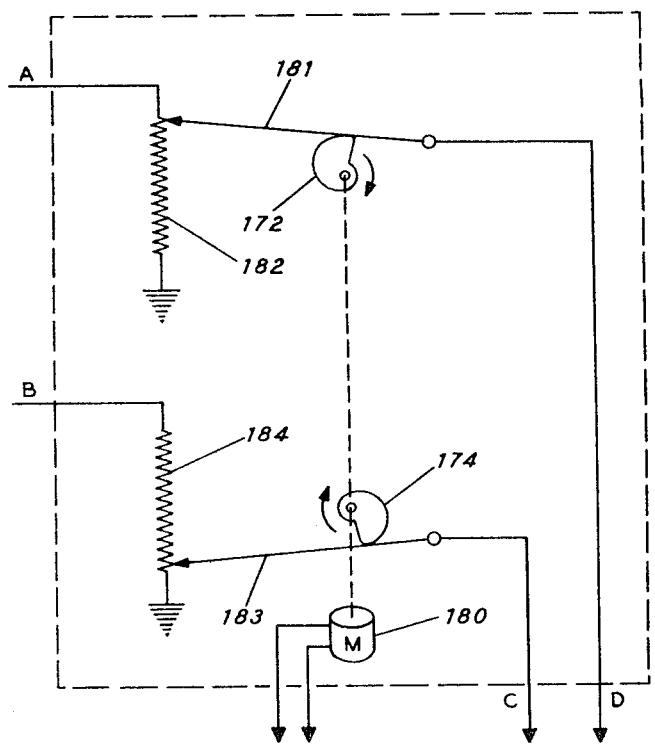
FIGURE 2 is an alternative form of the section of the system which mixes the preprogrammed seismic spectra.

An alternative form for the assembly 192, for selectively varying the spectrum is shown on FIGURE 2. Motor 180, driven synchronously with drums 8 and 190, rotates cams 172 and 174 to drive movable contacts 181 and 183 on potentiometers 182 and 184. Potentiometers 182 and 184 are grounded at one end and are directly connected to the outputs of the individual intermediate summing means at the other. Again, there is one potentiometer for each individual intermediate summing means. The signals taken from movable contacts 181 and 183, shown in FIGURE 2, are then introduced into final summing means, shown in FIGURE 1, as described above.

In order better to understand the net effect of the operation of the present invention reference may be had to FIGURES 3, 4A, 4B, 5A, 5B, 6A and 6B. The spectrum of a field recorded seismic signal is shown in the "before filtering" graph of FIGURE 4A. Both the low and the high frequencies have been reduced in amplitude by passage of the seismic energy through the earth and its inherent operation as a filter. After filtering by the apparatus which comprises the present invention the average amplitudes of the contiguous bands have been equalized as shown in FIGURE 4B. Correspondingly, the individual wavelets on the seismic record itself have been effectively contracted.

FIGURES 5A and 5B illustrate the spectrum of a single seismic trace taken early and late, respectively, along the seismic record. It may be seen from FIGURE 5B, taken late in the record, that the high frequency signals are seriously attenuated, whereas the low frequency signals are relatively less affected. FIGURE 5A illustrates the spectra of signals early in the record when the high frequency signals have been subjected to less attenuation. With the adaptive gain controls of the present invention it is possible to flatten the entire frequency spectrum throughout the entire record to produce a spectrum somewhat similar in appearance to that illustrated in FIGURE 4B. However, that is not always the optimum procedure. When the actual record spectrum is as deficient in high frequencies in its later portion, as is indicated in FIGURE 5B, if the high frequency portions are built up equally with the low frequency portions, the resulting record will have an objectionable signal-to-noise ratio, or, in other words, high frequency noise will actually be introduced by the processing. It is better to let the high frequency content decline somewhat, although not as much as in the original record. FIGURES 6A and 6B show two smoothed spectra for the early part and the late part, respectively of the final record. For the early part, the spectrum is to be held level out to about 50 cycles per second, whereas in the late part it is to be held level only to about 35 cycles per second.

Figure 3:
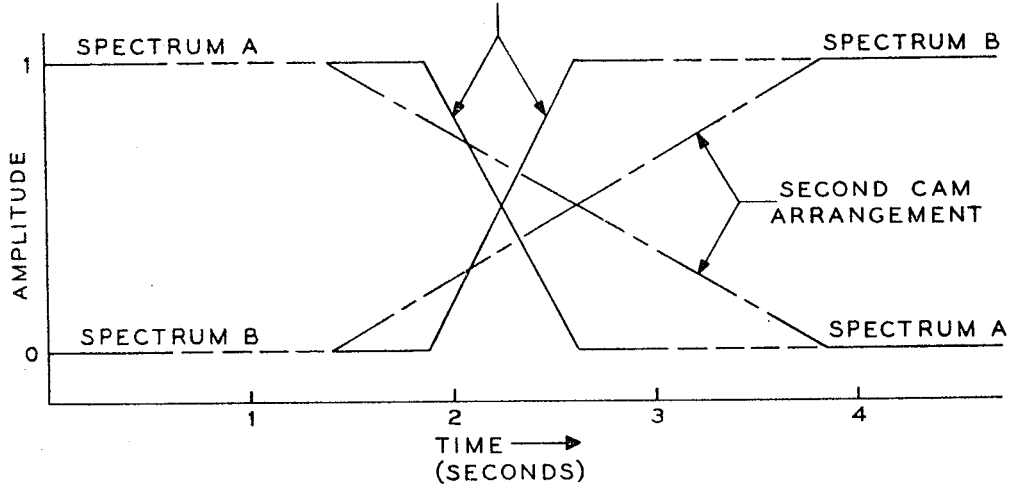
FIGURE 3 represents possible time-varying mixings of seismic spectra along a seismic record.

With the apparatus of the present invention, one may choose whatever time is most advantageous to make a transition from the spectrum of FIGURE 6A to that of FIGURE 6B. The transition may be quite abrupt, or it may be extended over a large part of the processing time. FIGURE 3 indicates how, by merely arranging the cams of the apparatus of FIGURES 1 and 2, one may obtain various transition rates. With a first cam arrangement, one may maintain Spectrum A (of FIGURE 6A) for about 2 seconds of the record processing time, then in a little over half a second make a smooth transition to Spectrum B, which is then maintained throughout the remainder of the processing time. With a second cam arrangement, one may maintain Spectrum A for only about 1.5 seconds, and then gradually make the transition to Spectrum B in the next 2.5 seconds, and maintain Spectrum B throughout the remainder of the time.

Other arrangements of cams and cam contours can be provided to include ramp or step functions in changing from Spectrum A to Spectrum B. Obviously, additional cams and spectrum shifts can be provided, with additional summing means such as 160 and 162 and multiplying means, such as 164 and 166.

The scope of the present invention is not to be considered as limited to the specific examples and techniques listed in the specification, but is properly to be determined by reference to the claims.

We claim:

1. An apparatus for processing a reproducible seismic record trace of amplitude varying time based reflection signals to produce an improved trace having a selected time-varying amplitude-versus-frequency spectrum comprising in combination:

(a) a playback mechanism for continuously generating electrical seismic signals from said seismic record trace, (b) a plurality of band-pass filters for receiving and filtering said electrical seismic signals each having an individual frequency bandwidth approximately equal to the reciprocal of the time duration of the expected earth-filter impulse response function, each of said filters having an individual frequency band that is contiguous and overlapping with the band of the next adjacent frequency bands and said plurality of filters in parallel having an amplitude response over the total frequency range that is substantially flat with respect to frequency, (c) a plurality of adaptive gain control units, each of said units being connected to the output of one of said filters, the time constant of each gain control unit being longer than the reciprocal of the band width of the expected earth-filter impulse response function, (d) a plurality of intermediate summing means, each receiving a predeterminable fraction of the output of each of said plurality of adaptive gain control units and each summing said outputs to form a plurality of intermediate composite signals, (e) preprogrammed means operable to time vary an output signal representative of each of said intermediate composite signals produced by said intermediate summing means, (f) final adding and recording means for combining said programmed intermediate composite signals into a final signal with a time-varying amplitude-versus-frequency spectrum, and for recording said final signal as said improved seismic trace whose time-varying amplitude-versus frequency spectrum has predetermined time-varying, mean amplitude levels in contiguous frequency bands that have widths approximately equal to the reciprocal of the time duration of the expected earth-filter impulse response function, and whose amplitude-versus-frequency spectrum retains spectral variations in the wavelets of the field recorded signal that were of bandwidths significantly shorter than those of said contiguous frequency bands.

2. An apparatus according to claim 1 with the addition of means for operating said playback and recording means at speeds several times the rate at which said seismic trace was originally recorded to speed up processing of said electrical seismic signal and to expand the frequency range of said electrical seismic signal by the same factor by which said operating rate is increased over said original recording rate.

3. An apparatus according to claim 2 wherein said factor by which said operating rate is increased is 4.

4. An apparatus according to claim 1 in combination with means for translating upwards all frequencies in said electrical seismic signal applied to said adaptive gain control units by modulating said electrical seismic signal on a carrier signal having a frequency many times higher than the frequencies in said electrical seismic signal to permit analysis of said modulated carrier signal at an optimum analysis frequency.

5. An apparatus according to claim 4 wherein the frequency of said carrier signal is of the order of tens of thousands of cycles per second.

6. An apparatus for processing a seismic record trace of amplitude-varying time-based reflection signals to produce an improved seismic trace having a selected time-varying amplitude-versus-frequency spectrum which comprises in combination:
(a) a playback mechanism for continuously generating an electrical seismic signal from said seismic record trace,
(b) means for operating said playback mechanism at several times the speed at which said seismic record trace was recorded to generate an electrical seismic signal having a frequency range expanded by the ratio between the trace recording and playback speeds,
(c) means for increasing the mean frequency of said generated electrical seismic signal by modulating said electrical seismic signal on a carrier signal whose frequency is many times higher than the frequencies in said generated electrical seismic signal in order to generate a modified signal of optimum frequency for convenient analysis,
(d) a plurality of parallel, band-pass filters for receiving and filtering said modified electrical seismic signal, each of said filters having an individual bandwidth approximately equal to the product of said speed ratio by which said signal is increased and the reciprocal of the time duration of the expected impulse response function of the earth formation through which said reflection signals have passed, the bandwidths of said filters being substantially equal, contiguous, and overlapping, to permit summation of the amplitude response curves of all bands over the total frequency range of said filters to be maintained substantially flat with respect to frequency,
(e) a plurality of adaptive gain control units, each unit accepting the output of one of said plurality of band-pass filters, the time constant of each gain control unit being longer than the product of the reciprocal of said factor by which said frequency of said generated signal is expanded and the time duration of the expected impulse response function of said earth formation,
(f) a plurality of sets of intermediate adding means for producing an intermediate composite signal, and means for supplying a predeterminable constant fraction of the output of all of said plurality of adaptive gain control units to said adding means,
(g) means for controlling the strengths of each of said intermediate composite signals produced by said intermediate adding means and preprogrammed means operable on said controlling means, and
(h) final adding and recording means for combining said controlled intermediate composite signals into a final signal with a time-varying amplitude-versus-frequency spectrum, and for recording said final signal as said improved seismic trace whose time-varying amplitude-versus-frequency spectrum had predetermined, time varying, mean amplitude levels in contiguous frequency bands that have widths approximately equal to the product of the factor by which the electrical seismic signal has been speeded up and the reciprocal of the time duration of the expected earth-filter impulse response function, and whose amplitude-versus-frequency spectrum retains the spectral variations of the field recorded signal that were of bandwidths significantly shorter than those of said contiguous frequency bands.

7. An apparatus according to claim 6 wherein said carrier signal is on the order of thousands of cycles per second.

8. An apparatus according to claim 6 wherein said carrier signal is approximately 24,000 cycles per second.

9. An apparatus according to claim 6 wherein said carrier signal is approximately 24,000 cycles per second and wherein said factor of the ratio between said recording and operating speeds is 4.

10. Apparatus for selectively improving the frequency spectrum of recorded seismic traces while retaining amplitude variations of wavelets in the traces which comprises
(a) means for reproducing a single trace from a plurality of phonographically recorded seismic traces,
(b) means for passing said seismic trace in common to multiplicity of adjacent and overlapping bandpass filters extending over the desired frequency spectrum, the frequency bandwidth of each filter being approximately equal to the reciprocal of the expected time constant of the earth filter response function of the geological strata wherein said seismic trace was recorded,
(c) individual adaptive gain control means connected to the output of each of said multiplicity of band-pass filters,
(d) means for selectively connecting in parallel the outputs of said gain control means to a plurality of summing circuits, said selective connecting means including means for proportioning the inputs from each of said gain control means to permit selected amounts of particular frequencies in said spectrum to be combined in said summing circuits, (e) a similar plurality of multiplying means connected to the output of each of said summing circuits, each of said multiplying means being operative in relation to the length of said trace to apply a desired portion of its output to the final output trace, and
(f) means for combining the outputs of said multiplying means to generate a final output trace, said output trace containing the amplitude variations of wavelets in the original trace with substantially less distortion therein due to the filtering action of the earth strata on seismic waves traveling therethrough.

References Cited

UNITED STATES PATENTS 3,321,739   5/1967   Lee _____ 340—15.5

RICHARD A. FARLEY, *Primary Examiner.*

CHARLES E. WANDS, *Assistant Examiner.*